US010802784B2

(12) United States Patent
Lee et al.

(10) Patent No.: US 10,802,784 B2
(45) Date of Patent: Oct. 13, 2020

(54) TRANSMISSION OF DATA RELATED TO AN INDICATOR BETWEEN A USER TERMINAL DEVICE AND A HEAD MOUNTED DISPLAY AND METHOD FOR CONTROLLING THE TRANSMISSION OF DATA

(71) Applicant: SAMSUNG ELECTRONICS CO., LTD., Suwon-si (KR)

(72) Inventors: Kwang-yong Lee, Suwon-si (KR); Ha-wook Jeong, Seoul (KR); Tae-hwa Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/269,345

(22) Filed: Sep. 19, 2016

(65) Prior Publication Data

US 2017/0083276 A1 Mar. 23, 2017

(30) Foreign Application Priority Data

Sep. 21, 2015 (KR) .................. 10-2015-0132930

(51) Int. Cl.
*G06F 3/14* (2006.01)
*G06F 3/147* (2006.01)
(Continued)

(52) U.S. Cl.
CPC ............ *G06F 3/1454* (2013.01); *G06F 1/163* (2013.01); *G06F 1/1684* (2013.01);
(Continued)

(58) Field of Classification Search
CPC ...... G06F 3/1454; G06F 3/147; G06F 3/0412; G06F 3/04815; G06F 3/04845;
(Continued)

(56) References Cited

U.S. PATENT DOCUMENTS 6,046,712 A * 4/2000 Beller .................. G02B 27/017
345/7
8,866,849 B1 10/2014 Cho et al.
(Continued)

FOREIGN PATENT DOCUMENTS

CN 103092399 A 5/2013
CN 103891269 A 6/2014
(Continued)

OTHER PUBLICATIONS

HoloLens | HoloLensStudio Demo | Windows 10 | Microsoft HaloLens https://www.youtube.com/watch?v=qym11JnFQBM, Published on Jan. 21, 2015.*
(Continued)

*Primary Examiner* — Temesghen Ghebretinsae
*Assistant Examiner* — Ivelisse Martinez Quiles
(74) *Attorney, Agent, or Firm* — Sughrue Mion, PLLC

(57) ABSTRACT

A user terminal device includes a communicator configure to communicate with an external device; a touchscreen configured to display an image and to receive a touch input; and a controller configured to control the touchscreen to display an image received from the external device through the communicator, to control the touchscreen to display a first indicator associated with an object included in the displayed image, in response to the touch input being detected on the image displayed on the touchscreen, the first indicator being displayed at a point where the touch input is detected, and to control the communicator to transmit data related to the first indicator to the external device, the data comprising information to be used by the external device in determining a position of a second indicator to be included in an image displayed in the external device.

8 Claims, 23 Drawing Sheets

(51) Int. Cl.
*G06F 3/01* (2006.01)
*G06F 3/0488* (2013.01)
*G06F 1/16* (2006.01)
*G06F 3/03* (2006.01)
*G06F 3/0482* (2013.01)
*G06F 3/0484* (2013.01)
*G06F 3/0481* (2013.01)
*G06T 15/20* (2011.01)

(52) U.S. Cl.
CPC .......... *G06F 1/1686* (2013.01); *G06F 1/1694* (2013.01); *G06F 3/011* (2013.01); *G06F 3/0304* (2013.01); *G06F 3/0482* (2013.01); *G06F 3/04815* (2013.01); *G06F 3/04845* (2013.01); *G06F 3/04883* (2013.01); *G06F 3/147* (2013.01); *G06T 15/205* (2013.01); *G09G 2340/12* (2013.01); *G09G 2340/125* (2013.01); *G09G 2340/14* (2013.01); *G09G 2354/00* (2013.01); *G09G 2370/16* (2013.01)

(58) Field of Classification Search
CPC .... G06F 3/0482; G06F 3/0488; G06F 3/0414; G06F 3/0416; G06F 2203/041; G06F 3/0481; G06F 3/00; G06F 3/01; G06F 3/041–04897; G06F 3/011; G06F 3/04883; G06F 2203/04105; G06T 15/205; G06T 19/00–20; G09G 2370/16; G09G 2354/00; G09G 2340/14; G09G 2340/125; G09G 2340/12; G09G 5/00; G02B 27/01; H04W 88/02
See application file for complete search history.

(56) References Cited

U.S. PATENT DOCUMENTS

| | | | |
|---|---|---|---|
| 9,244,562 B1* | 1/2016 | Rosenberg | G06F 3/04847 |
| 9,342,167 B2 | 5/2016 | Miyazawa | |
| 9,503,681 B1* | 11/2016 | Popescu | G06T 19/006 |
| 9,746,671 B2 | 8/2017 | Fujigaki | |
| 10,318,103 B2 | 6/2019 | Miyazawa | |
| 2012/0054665 A1* | 3/2012 | Kano | G06F 3/04847 |
| | | | 715/776 |
| 2012/0105367 A1 | 5/2012 | Son et al. | |
| 2012/0302289 A1 | 11/2012 | Kang | |
| 2013/0106842 A1 | 5/2013 | Miyazawa | |
| 2013/0234914 A1 | 9/2013 | Fujimaki | |
| 2013/0307842 A1 | 11/2013 | Grinberg et al. | |
| 2013/0342501 A1* | 12/2013 | Molne | G06F 3/0414 |
| | | | 345/174 |
| 2014/0081634 A1 | 3/2014 | Forutanpour et al. | |
| 2014/0204002 A1 | 7/2014 | Bennet et al. | |
| 2014/0210742 A1* | 7/2014 | Delattre | G06F 3/04883 |
| | | | 345/173 |
| 2014/0232620 A1 | 8/2014 | Fujigaki | |
| 2014/0368447 A1* | 12/2014 | Saini | G06F 3/04883 |
| | | | 345/173 |
| 2015/0130688 A1 | 5/2015 | Li et al. | |
| 2015/0206005 A1* | 7/2015 | Jung | G06K 9/00402 |
| | | | 382/189 |
| 2015/0212647 A1* | 7/2015 | Kim | G02B 27/017 |
| | | | 345/173 |
| 2015/0234462 A1 | 8/2015 | Miller et al. | |
| 2015/0261330 A1* | 9/2015 | Jalali | G06F 3/04815 |
| | | | 345/173 |
| 2015/0317053 A1* | 11/2015 | Baek | G06F 3/0488 |
| | | | 715/765 |
| 2016/0049011 A1* | 2/2016 | Kasahara | G06T 19/006 |
| | | | 345/633 |
| 2016/0239134 A1* | 8/2016 | Tseng | G06F 3/0488 |
| 2016/0246367 A1* | 8/2016 | Tungare | G06F 3/0487 |
| 2016/0266765 A1 | 9/2016 | Miyazawa | |
| 2016/0291922 A1* | 10/2016 | Montgomerie | G06T 19/006 |
| 2016/0292925 A1* | 10/2016 | Montgomerie | G06T 19/006 |
| 2016/0314759 A1* | 10/2016 | Shin | G06F 3/0488 |
| 2016/0358383 A1* | 12/2016 | Gauglitz | G06T 19/006 |

FOREIGN PATENT DOCUMENTS

| | | |
|---|---|---|
| JP | 2011-129969 A | 6/2011 |
| KR | 10-2011-0080915 A | 7/2011 |
| KR | 10-2012-0008400 A | 1/2012 |
| KR | 10-2012-0120858 A | 11/2012 |
| KR | 10-2014-0081642 A | 7/2014 |
| KR | 10-2015-0025116 A | 3/2015 |
| WO | 2014/162824 A1 | 9/2014 |
| WO | 2015/066332 A1 | 7/2015 |

OTHER PUBLICATIONS

International Search Report, issued by International Searching Authority in corresponding International Application No. PCT/KR2016/010455, dated Jan. 4, 2017, (PCT/ISA/210).

Written Opinion, issued by International Searching Authority in corresponding International Application No. PCT/KR2016/010455, dated Jan. 4, 2017, (PCT/ISA/237).

Communication dated May 8, 2018 from the European Patent Office in counterpart European Application No. 16848876.5.

Nick Statt "Microsoft's HoloLens explained: How it works and why it's different" CNET, Jan. 24, 2015, Retrieved from the Internet: URL:http://www.cnet.com/news/microsoft-hololens-explained-how-it-works-and-why-its-different/ [retrieved on Jul. 20, 2016] (5 pages total) XP055289839.

Steffen Gauglitz et al. "World-Stabilized Annotations and Virtual Scene Navigation for Remote Collaboration" UIST, Oct. 5-8, 2014 (pp. 449-459) XP058058529.

Communication dated Aug. 8, 2018 from the European Patent Office in counterpart European Application No. 16848876.5.

Pavel Gurevich et al. "TeleAdvisor: A Versatile Augmented Reality Tool for Remote Assistance" Proceedings of the 2012 ACM Annual Conference on Human Factors in Computing Systems, May 10, 2015 (pp. 619-622) XP055334253.

Communication dated Apr. 5, 2019, issued by the European Patent Office in counterpart European Application No. 16 848 876.5.

* cited by examiner

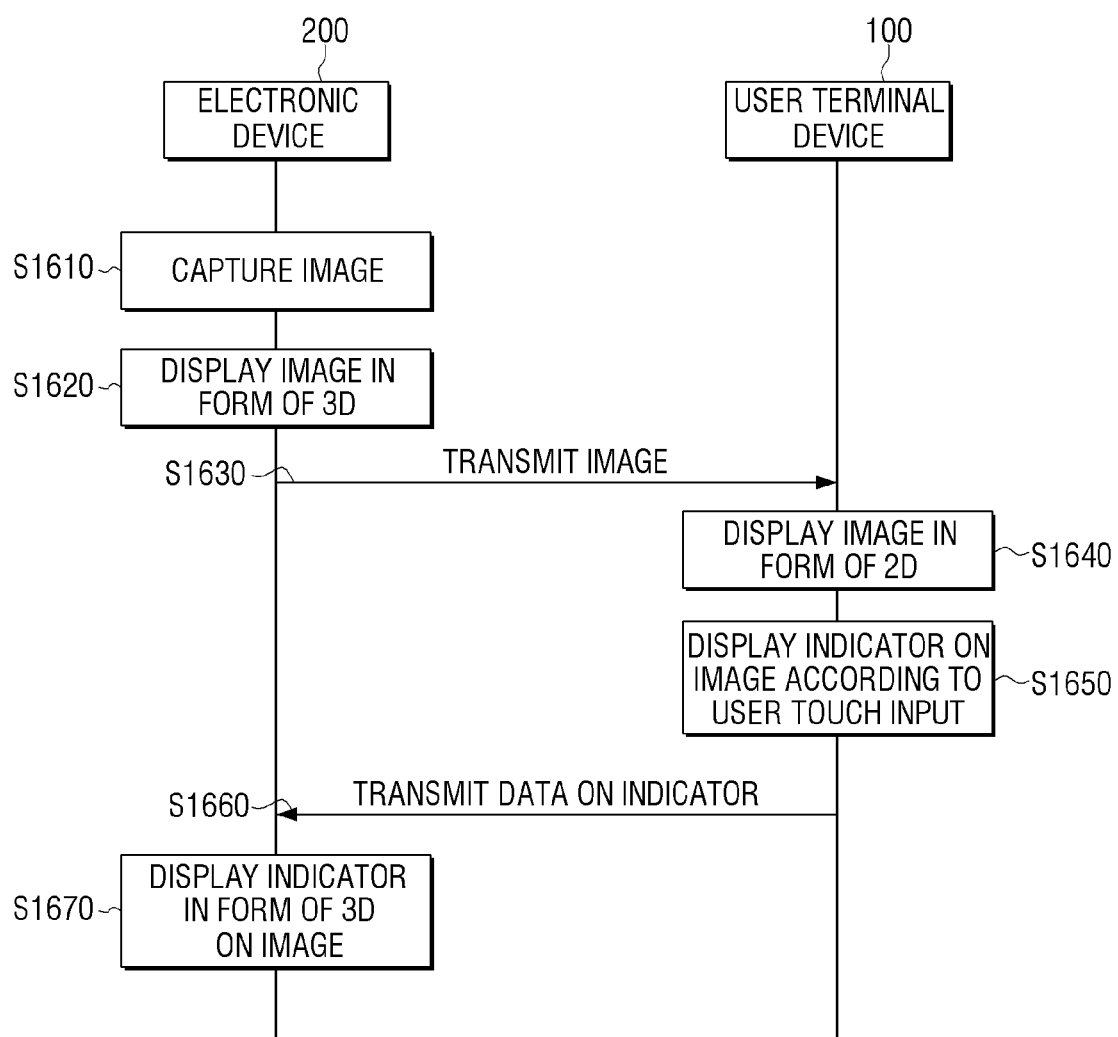

TRANSMISSION OF DATA RELATED TO AN INDICATOR BETWEEN A USER TERMINAL DEVICE AND A HEAD MOUNTED DISPLAY AND METHOD FOR CONTROLLING THE TRANSMISSION OF DATA

CROSS-REFERENCE TO RELATED APPLICATION

This application claims priority from Korean Patent Application No. 10-2015-0132930, filed on Sep. 21, 2015, in the Korean Intellectual Property Office, the disclosure of which is incorporated herein by reference in its entirety.

BACKGROUND

Field

Apparatuses and methods consistent with exemplary embodiments relate to a user terminal device, an electronic device, and a method of controlling the user terminal device and the electronic device, and more particularly, to a user terminal device, an electronic device, and a method of controlling the user terminal device and the electronic device, by which an image is shared by the user terminal device and the electronic device and the user terminal device provides an indicator in the shared image.

Description of the Related Art

Recently, an electronic device (e.g., a head mounted device (HMD)) that is worn by a user and provides virtual reality has drawn considerable attention. For example, when a user wears an HMD, he or she may see and enjoy a realistic three-dimensional (3D) view in a virtual world that is completely different from reality. With regard to a typical two-dimensional (2D)-based game, a user may enjoy a compared realistic game with a 360-degree view and, thus, many VR contents have been introduced from game contents and it has also been expected that virtual reality is used in various fields such as remote education and medicine using a service for experience share with a remote place.

An electronic device that wears a user and provides 3D type virtual reality may be largely classified into a See-Through type device and a See-Closed type. The See-Closed type device may allow various experiences only in a completely different virtual space from reality but the See-Through type device may project an augmented object to a realistic space to acquire augmented reality in reality.

An electronic device for providing virtual reality may be operatively associated with an external user terminal device. Typically, unilateral information transmission and interaction are present between a user terminal device and an electronic device for providing virtual reality. That is, typically, information of a user terminal device is unilaterally transmitted to an electronic device or an image of the electronic device may be unilaterally transmitted to the user terminal device.

That is, typically, it may be impossible to perform interaction between the user terminal device and the electronic device for providing virtual reality.

SUMMARY

Exemplary embodiments of the disclosure may overcome the above disadvantages and other disadvantages not described above. Also, the exemplary embodiments are not required to overcome the disadvantages described above, and the exemplary embodiments of the disclosure may not overcome any of the problems described above.

One or more exemplary embodiments provide a user terminal device, an electronic device, and a method of controlling the user terminal device and the electronic device, for providing more intuitive and various user environments via two-way communication between the user terminal and the electronic device.

According to an aspect of an exemplary embodiment, there is provided a user terminal device including a communicator configure to communicate with an external electronic device, a touchscreen configured to display an image and to detect a touch input of a user, and a controller configured to control the touchscreen to display an image received from the external electronic device through the communicator, to control the touchscreen to generate and display an indicator indicating an object included in the image at a point in which a user touch is detected in response to the user touch being detected from the image displayed on the touchscreen, and to control the communicator to transmit data on the indicator to the external electronic device.

The controller may control the communicator to receive together a plurality of image frames of the captured image and camera pose data corresponding to the plurality of image frames.

The controller may control the touchscreen to generate and display the indicator at a point in which a user touch of a selected image frame is detected in response to one of the plurality of image frames being selected according to a user command and to a user touch being detected during display of the selected image frame and may control the communicator to transmit together the data on the indicator and the camera pose data corresponding to the selected image frame.

The user terminal device may display the captured image and the indicator in the form of 2D, and the external electronic device may display the captured image and the indicator in the form of 3D based on the data on the indicator and the camera pose data corresponding to the selected image frame.

The controller may control the communicator to receive one image frame of the captured image, and the external electronic device may display the captured image and the indictor in the form of 3D based on the data on the indicator and the camera pose data corresponding to the one pre-stored image frame.

The controller may adjust a z-axis location of the indicator according to at least one of a touch pressure and a touch size of the user touch.

The controller may adjust a thickness of the indicator according to at least one of a touch pressure and a touch size of the user touch.

The controller may control the touchscreen to generate and display a selected indicator model at a point in which a user touch is detected in response to one of pre-stored indicator models being selected based on the user touch.

The data on the indicator may include at least one of a coordinate value of a location for displaying the indicator, a shape of the indicator, a size of the indicator, and a thickness of the indicator.

According to an aspect of another exemplary embodiment, there is provided a method of controlling a user terminal device including receiving an image captured by an external electronic device, displaying the image, generating and displaying an indicator indicating an object included in the image at a point in which a user touch is detected in response to the user touch being detected from the displayed image, and transmitting data on the indicator to the external electronic device.

The receiving may include receiving together a plurality of image frames of the captured image and camera pose data corresponding to the plurality of image frames.

The receiving may include selecting one of the plurality of image frames according to a user command, and, in response to a user touch being detected during display of the selected image frame, generating and displaying the indicator at a point in which the user touch of the selected image frame is detected, and the transmitting may include together transmitting the data on the indicator and the camera pose data corresponding to the selected image frame.

The user terminal device may display the captured image and the indicator in the form of 2D, and the external electronic device may display the captured image and the indicator in the form of 3D based on the data on the indicator and the camera pose data corresponding to the selected image frame.

The receiving may include receiving one image frame of the captured image, and the external electronic device may display the captured image and the indictor in the form of 3D based on the data on the indicator and the camera pose data corresponding to the one pre-stored image frame.

The method may further include adjusting a z-axis location of the indicator according to at least one of a touch pressure and a touch size of the user touch.

The method may further include adjusting a thickness of the indicator according to at least one of a touch pressure and a touch size of the user touch.

The displaying may include selecting one from pre-stored indicator models based on a user touch, and generating and displaying the selected indicator model at a point in which the use touch is detected.

The data on the indicator may include at least one of a coordinate value of a location for displaying the indicator, a shape of the indicator, a size of the indicator, and a thickness of the indicator.

According to an aspect of another exemplary embodiment, there is provided an electronic device including an image capturer configured to capture an image, a display configured to display the captured image in the form of 3D, a communicator configured to communicate with an external user terminal device, and a controller configured to control the communicator to transmit the captured image to the external user terminal device during display of the captured image in the form of 3D and to receive data on an indicator indicating an object included in the captured image from the external user terminal device and configure to control the display to display the indicator on the captured image in the form of 3D using the data on the indicator and camera pose data.

The controller may control the communicator to transmit a first image frame of the captured image, photographed at a specific angle, to the external user terminal device, and the camera pose data may be acquired during photograph of the first image frame.

The controller may control the communicator to transmit a plurality of image frames of the captured image and camera pose data corresponding to the plurality of image frames to the external user terminal device and to together receive camera pose data corresponding to a second image frame selected from the plurality of image frames.

The data on the indicator may include at least one of a coordinate value of a location for displaying the indicator, a shape of the indicator, a size of the indicator, and a thickness of the indicator.

The electronic device may be a head mount device.

According to an aspect of another exemplary embodiment, there is provided a method of controlling an electronic device may include capturing an image, transmitting the captured image to an external user terminal device during display of the captured image in the form of 3D, receiving data on an indicator indicating an object included in the captured image from the user terminal device; and displaying the indicator on the captured image in the form of 3D using the data on the indicator and the camera pose data.

The transmitting may include transmitting a first image frame of the captured image, photographed at a specific angle, to the external user terminal device and the camera pose data may be acquired during photograph of the first image frame.

The transmitting may include transmitting a plurality of image frames of the captured image and camera pose data corresponding to the plurality of image frames to the external user terminal device and the receiving may include together receiving camera pose data corresponding to a second image frame selected from the plurality of image frames.

The data on the indicator may include at least one of a coordinate value of a location for displaying the indicator, a shape of the indicator, a size of the indicator, and a thickness of the indicator.

The electronic device may be a head mount device.

According to the diverse exemplary embodiments of the present disclosure, various interactions may be enabled between a user terminal device and an electronic device for providing virtual reality, such as a HMD, thereby providing more intuitive and various user environments to a user.

According to an aspect of another exemplary embodiment, there is provided a communicator configure to communicate with an external device; a touchscreen configured to display an image and to receive a touch input; and a controller configured to control the touchscreen to display an image received from the external device through the communicator, to control the touchscreen to display a first indicator associated with an object included in the displayed image, in response to the touch input being detected on the image displayed on the touchscreen, the first indicator being displayed at a point where the touch input is detected, and to control the communicator to transmit data related to the first indicator to the external device, the data including information to be used by the external device in determining a position of a second indicator to be included in an image displayed in the external device.

The controller may be configured to control the communicator to receive a plurality of image frames of the image from the external device and camera pose data corresponding to the plurality of image frames.

The controller may be configured to control the touchscreen to display the first indicator at a point where a touch input on a selected image frame of the plurality of image frames is detected in response to one of the plurality of image frames being selected according to a user command and in response to the touch input being detected during display of the selected image frame and to control the communicator to transmit the data related to the first indicator and camera pose data corresponding to the selected image frame.

The user terminal device may be configured to display the image and the first indicator in a two-dimensional (2D) form; and the external device may be configured to display the image and the second indicator in a three-dimensional (3D) form based on the data related to the first indicator and camera pose data corresponding to the selected image frame.

The controller may be configured to control the communicator to receive an image frame of the image; and the external device may be configured to display the image and the second indictor in the 3D form based on the data related to the first indicator and the camera pose data corresponding to the image frame.

The controller may be configured to adjust a z-axis information of the first indicator according to at least one of a touch pressure and a touch size of the touch input.

The controller may be configured to adjust a thickness of the first indicator according to at least one of a touch pressure and a touch size of the touch input.

The controller may be configured to control the touchscreen to display a selected indicator model at a point in which the touch input is detected in response to one of pre-stored indicator models being selected based on a touch input.

The data related to the first indicator may include at least one of a location coordinate value of the first indicator, a shape of the first indicator, a size of the first indicator, and a thickness of the first indicator.

According to an aspect of another exemplary embodiment, there is provided a receiving an image captured by an external device; displaying the image on the user terminal device; displaying, on the user terminal device, a first indicator associated with an object included in the image in response to the touch input being detected on the displayed image, the first indicator being displaying at a point where the touch input is detected; and transmitting data related to the first indicator to the external device, wherein the data includes information to be used by the external device in determining a position of a second indicator to be included in an image displayed in the external device.

The receiving the image may include receiving a plurality of image frames of the captured image and camera pose data corresponding to the plurality of image frames.

The receiving the image may include: selecting one of the plurality of image frames according to a user command; and in response to a touch input being detected during displaying the selected image frame of the plurality of image frames, displaying the first indicator at a point where the touch input on the selected image frame is detected; and the transmitting the data includes transmitting the data related to the first indicator and camera pose data corresponding to the selected image frame.

The user terminal device displays the captured image and the first indicator in a 2D form; and the external device displays the captured image and the second indicator in a 3D form based on the data related to the first indicator and the camera pose data corresponding to the selected image frame.

The receiving the image includes receiving an image frame of the captured image; and displaying, by the external device, the captured image and the second indictor in a 3D form based on the data on the first indicator and camera pose data corresponding to the image frame.

The method may further include adjusting a z-axis information of the first indicator according to at least one of a touch pressure and a touch size of the touch input.

The method may further include adjusting a thickness of the first indicator according to at least one of a touch pressure and a touch size of the touch input.

The displaying the first indicator may include: selecting one from pre-stored indicator models based on a touch input; and displaying the selected indicator model at a point where the touch input is detected.

The data related to the first indicator may include at least one of a location coordinate value of the first indicator, a shape of the first indicator, a size of the first indicator, and a thickness of the first indicator.

According to an aspect of another exemplary embodiment, there is provided an image capturer configured to capture an image; a display configured to display the captured image in a 3D form; a communicator configured to communicate with a user terminal device; and a controller configured to control the communicator to transmit the captured image to the user terminal device during displaying the captured image in the 3D form, configured to control the communicator to receive information on a first indicator associated with an object included in the captured image from the user terminal device and configure to control the display to display a second indicator on the captured image in the 3D form based on the information on the first indicator and camera pose data.

The controller may be configured to control the communicator to transmit a first image frame of the captured image to the external user terminal device, the first image frame being photographed at a specific angle; and the camera pose data may be acquired based on the first image frame.

According to an aspect of another exemplary embodiment, there is provided a communicator configure to communicate with a second electronic device; a touch display configured to display an image received from the second electronic device and configured to receive a touch input, the image from the second electronic device including an object; and a controller configured to control the touch display to display a first indicator associated with the object in response to the touch input being detected from the image displayed on the touchscreen, the first indicator being displayed at a location where the touch input is detected, and configured to control the communicator to transmit information on the first indicator to the second electronic device, the information being used by the second electronic device in determining a position of a second indicator to be included in an image displayed in the second electronic device.

The information on the first indicator may include at least one of a location coordinate value of the first indicator, a shape of the first indicator, a size of the first indicator, and a thickness of the first indicator.

The first indicator and the second indicator may include an arrow.

Attributes of the arrow may be changed according to at least one of a touch pressure and a touch size of the touch input.

Additional and/or other aspects and advantages of the exemplary embodiments will be set forth in part in the description which follows and, in part, will be obvious from the description, or may be learned by practice of the invention.

BRIEF DESCRIPTION OF THE DRAWING FIGURES

The above and/or other aspects of the disclosure will be more apparent by describing certain exemplary embodiments of the inventive concept with reference to the accompanying drawings, in which:

FIG. 16 is a sequence diagram for explanation of a method of providing an image of an image providing system according to an exemplary embodiment.

DETAILED DESCRIPTION

Figure 1:
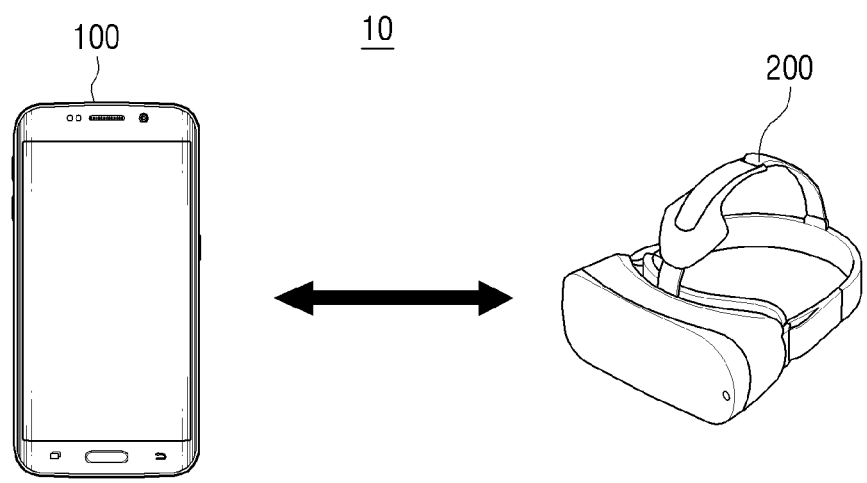
FIG. 1 is a diagram illustrating an image providing system according to an exemplary embodiment.

Terms used in the present specification will be simply described and the disclosure will be described in detail.

The terminology used herein is for the purpose of describing particular exemplary embodiments only and is not intended to limit of the inventive concept of the disclosure. Unless otherwise defined, all technical terms used herein have the same meaning as commonly understood by one of ordinary skill in the art to which this present disclosure pertains and will not be interpreted in an overly wide or narrow sense unless expressly so defined herein. If a term used herein is a wrong term by which one of ordinary skill in the art cannot correctly understand the inventive concept, the wrong term should be replaced by a technical term by which one of ordinary skill in the art can correctly understand the inventive concept. It will be further understood that terms, such as those defined in commonly used dictionaries, should be interpreted as having a meaning that is consistent with their meaning in the context of the relevant art and will not be interpreted in an overly narrow sense.

As the inventive concept allows for various changes and numerous exemplary embodiments, particular exemplary embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the inventive concept are encompassed in the disclosure. In the description of the disclosure, certain detailed explanations of related art are omitted when it is deemed that they may unnecessarily obscure the essence of the inventive concept.

The terms such as "first" and "second" are used herein merely to describe a variety of constituent elements, but the constituent elements are not limited by the terms. The terms are used only for the purpose of distinguishing one constituent element from another constituent element.

The terms used in the present specification are used for explaining a specific exemplary embodiment, not limiting the present inventive concept. Thus, the singular expressions in the present specification include the plural expressions unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The terms such as "unit", "module", etc. disclosed in the specification mean units for processing at least one function or operation, which may be implemented by hardware, software, or a combination thereof. In addition, a plurality of 'modules' or a plurality of 'units' may be integrated into at least one module to be embodied as at least one processor except for a 'module' or a 'unit' that needs to be embodied as a specific hardware.

In the specification, when it is described that a certain part is "connected" to another part, it should be understood that the certain part may be directly connected to another part or electrically connected to another part via another part in the middle. In addition, when a certain part "includes" a certain component, this indicates that the part may further include another component instead of excluding another component unless there is no different disclosure.

Exemplary embodiments of the disclosure are described in detail so as for those of ordinary skill in the art to easily implement with reference to the accompanying drawings. However, the inventive concept may be implemented in various different forms and is not limited to the exemplary embodiments. To clearly describe the inventive concept, a part without concerning to the description is omitted in the drawings, and like reference numerals in the specification denote like elements.

FIG. 1 is a diagram illustrating an image providing system 10 according to an exemplary embodiment. As illustrated in FIG. 1, the image providing system 10 may include a user terminal device 100 and an external electronic device 200. In this case, the user terminal device 100 may be a device for providing a two-dimensional (2D) image, such as a smart phone and may be embodied as various devices such as a tablet PC, a notebook PC, a smart TV, and a desktop PC. The external electronic device 200 may be a device that a user wears and provides a stereoscopic three-dimensional (3D) image, such as a head mounted device (HMD) and may be embodied as various electronic devices such as a smart glass.

The external electronic device 200 may capture an image of the front of a user using a camera. The external electronic device 200 may display the captured image in the form of a 3D image, insert an augmented reality (AR) object into the captured image, and display the image. That is, the external electronic device 200 may insert an element (e.g., an AR element) of a virtual environment into an actual environment that a user sees to provide a new user environment. For example, when a first user wears the external electronic device 200 and sees a specific space, the external electronic device 200 may photograph the specific space, display the captured image in the form of a 3D image, and insert a virtual AR object into the 3D image.

Upon photographing the front of the user using a camera, the electronic device 200 may also acquire camera pose data.

In addition, the external electronic device 200 may display the captured image and may also transmit the image to the external user terminal device 100. In this case, the external electronic device 200 may transmit all image frames of the captured image but this is merely an exemplary embodiment and, thus, only some image frames of the captured image may be transmitted. In particular, when the external electronic device 200 transmits a plurality of image frames of the captured image to the user terminal device 100, the external electronic device 200 may also transmit camera pose data corresponding to a plurality of image frames as well as a plurality of image frames of the captured image. In addition, when the external electronic device 200 transmits only one image frame of the captured image, the external electronic device 200 may transmit only one image frame and may also transmit the camera pose data.

The user terminal device 100 may display the image transmitted from the external electronic device 200. In this case, the user terminal device 100 may display the image transmitted from the external electronic device in the form of a 2D image. When the external electronic device 200 transmits a plurality of image frames, the user terminal device 100 may display the image captured by the external electronic device 200 in real time like video. When the external electronic device 200 transmits one frame of the captured image, the user terminal device 100 may display only one transmitted frame.

Upon detecting a user touch on a received image being displayed on the terminal device 100, the user terminal device 100 may generate and display an indicator indicating an object to be included in the received image at a point/a location at which the user touch is detected. In addition, the user terminal device 100 may transmit information/data of the indicator to the external electronic device 200. In this case, the data of the indicator may include information on at least one of a coordinate value related to displaying the indicator, a shape of the indicator, the size of the indicator, and the thickness of the indicator. Here, the indicator is associated with the object included in the received image and may indicate directional information related to/associated with the object.

In particular, when a plurality of image frames are transmitted, one image frame may be selected among the plurality of image frames, and upon detecting a user touch on the selected image frame being displayed, the user terminal device 100 may generate and display the indicator indicating an object at a point/a location at which the user touch of the selected image frame is detected. The user terminal device 100 may transmit data of the indicator and camera pose data corresponding to the selected image frame to the external electronic device 200 together.

When one image frame is transmitted, if a user touch on the one transmitted image frame is detected, the user terminal device 100 may generate and display an indicator indicating an object at a point/a location at which the user touch on one image frame is detected. In addition, the user terminal device 100 may transmit data of the indicator to the external electronic device 200.

In addition, the external electronic device 200 may also generate and display the indicator in the three-dimensional (3D) form (i.e., a 3D object) on an image displayed in the 3D form based on the data of the indicator and the camera pose data transmitted from the user terminal device.

For example, a father is using the user terminal device 100 and a daughter is doing video telephony using the external electronic device 200. The father is holding the user terminal device 100 with the hand and the daughter is wearing the external electronic device 200. The father is watching a camera image captured by the external electronic device 200, which is streamed to the user terminal device 100, and the daughter is seeing a face of the father of video telephony, which is photographed by the user terminal device 100 and is projected to an AR object to a wall of her room. In this case, the daughter wants to repair a broken pipe of a washstand in her room. During video telephony, the daughter asks how the broken pipe can be repaired and the father guides her while seeing an image of her room being transferred from her external electronic device 200, streamed to his user terminal device 100. An indicator may be generated in an image on the user terminal device 100 via a touch input by the father in an image displayed in his user terminal device 100. When an indicator such as an arrow may be displayed in a pipe in the image and the father manipulates the indicator in a direction of turning and adjusting the pipe, the user terminal device 100 of the father may transmit the indicator to the external electronic device 200. The external electronic device 200 may generate and display together an indicator such as an arrow in a captured image of a pipe of a washstand. The daughter may successfully repair the pipe according to the guidance of the father, displayed by the electronic device 200.

That is, like in the aforementioned scenario, various interactions are enabled between the user terminal device 100 and the electronic device 200 for providing/exchanging information in virtual reality, such as an HMD, thereby providing more intuitive and various user environments to a user.

Hereinafter, the user terminal device 100 according to an exemplary embodiment will be described in more detail with reference to FIGS. 2 to 7.

Figure 2:
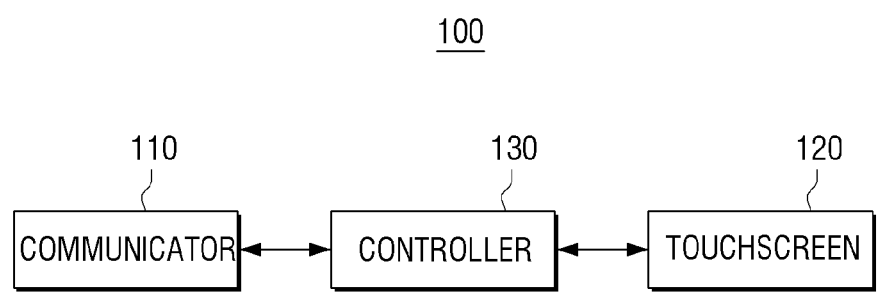
FIG. 2 is a schematic block diagram illustrating a configuration of a user terminal device according to an exemplary embodiment.

FIG. 2 is a schematic block diagram illustrating a configuration of the user terminal device 100 according to an exemplary embodiment. As illustrated in FIG. 2, the user terminal device 100 may include a communicator 110, a touchscreen 120, and a controller 130. In the exemplary embodiment, the user terminal device 100 may be a smart phone but the exemplary embodiment is not limited thereto. For example, the user terminal device 100 may be embodied as various devices such as a tablet PC, a notebook PC, a smart TV, and a desktop PC.

The communicator 110 may communicate with the external electronic device 200. In particular, the communicator 110 may receive information on an image captured by the external electronic device 200 from the external electronic device 200. In addition, the communicator 110 may transmit together data of an indicator and camera pose data to the external electronic device 200.

The touchscreen 120 may display an image and detect a user touch (i.e., a touch input). In particular, the touchscreen 120 may display an image received from the external electronic device 200. In addition, the touchscreen 120 may display the indicator at a point (i.e., at a location) at which the user touch is detected.

The controller 130 may control an overall operation of the user terminal device 100. In particular, the controller 130 may control the touchscreen 120 to display the image received from the external electronic device 200 through the communicator 110. Upon detecting a user touch on the image (received from the external electronic device 200) displayed on the touchscreen 120, the controller 130 may control the touchscreen 120 to generate and display an indicator indicating an object contained in an image at a point/a location at which a user touch is detected. In addition, the controller 130 may control the communicator 110 to transmit the data of the indicator to the external electronic device 200.

In detail, upon receiving, by the communicator 110, a plurality of image frames of an image captured from the external electronic device 200 and camera pose data corresponding to the plurality of image frames together, the controller 130 may process the plurality of received image frames and display the image frames in real time like video. In the exemplary embodiment, the controller 130 may display the image in 2D.

Upon selecting one image frame from a plurality of image frames according to a user command and detecting a user touch during display of the selected image frame, the controller 130 may control the touchscreen 120 to generate and display the indicator at a point/a location at which the user touch of the selected image frame is detected. In addition, the controller 130 may control the communicator 110 to transmit data of the indicator and camera pose data corresponding to the selected image frame together. Here, the data of the indicator may include information on at least one of a coordinate value related to displaying the indicator (e.g., a location coordinate value of the indicator), a shape of the indicator, the size of the indicator, and the thickness of the indicator. In addition, the external electronic device 200 may display an indicator in a 3D form in a captured image based on the data of the indicator and the camera pose data received from the user terminal device 100.

When the communicator 110 receives only one image frame of an image captured by the external electronic device 200, the controller 130 may control the touchscreen 120 to generate and display the indicator at a point in which a user touch is detected in the one received frame. In addition, the controller 130 may control the communicator 110 to transmit the data of the indicator to the external electronic device 200. In this case, the external electronic device 200 may display the image captured in the 3D form and may display the indicator based on the camera pose data corresponding to one pre-stored image frame and the data of the indicator received from the user terminal device 100.

The controller 130 may generate an indicator according to a user touch. In detail, the controller 130 may adjust a z-axis location of the indicator according to at least one of a touch pressure and a touch size of the user touch. In addition, the controller 130 may adjust the thickness of the indicator according to at least one of a touch pressure and a touch size of the user touch.

In addition, the controller 130 may generate an indicator according to a user touch point but this is merely an exemplary embodiment and, thus, the controller 130 may generate an indicator model selected by a user among a plurality of indicator modes as the indicator. In detail, the controller 130 may control the touchscreen 120 to display a list including a plurality of indicator models at a user touch point. In addition, when one is selected among the plurality of indicator models contained in the list, the controller 130 may control the touchscreen 120 to generate and display the selected indicator model at a point in which the user touch is detected.

Figure 3:
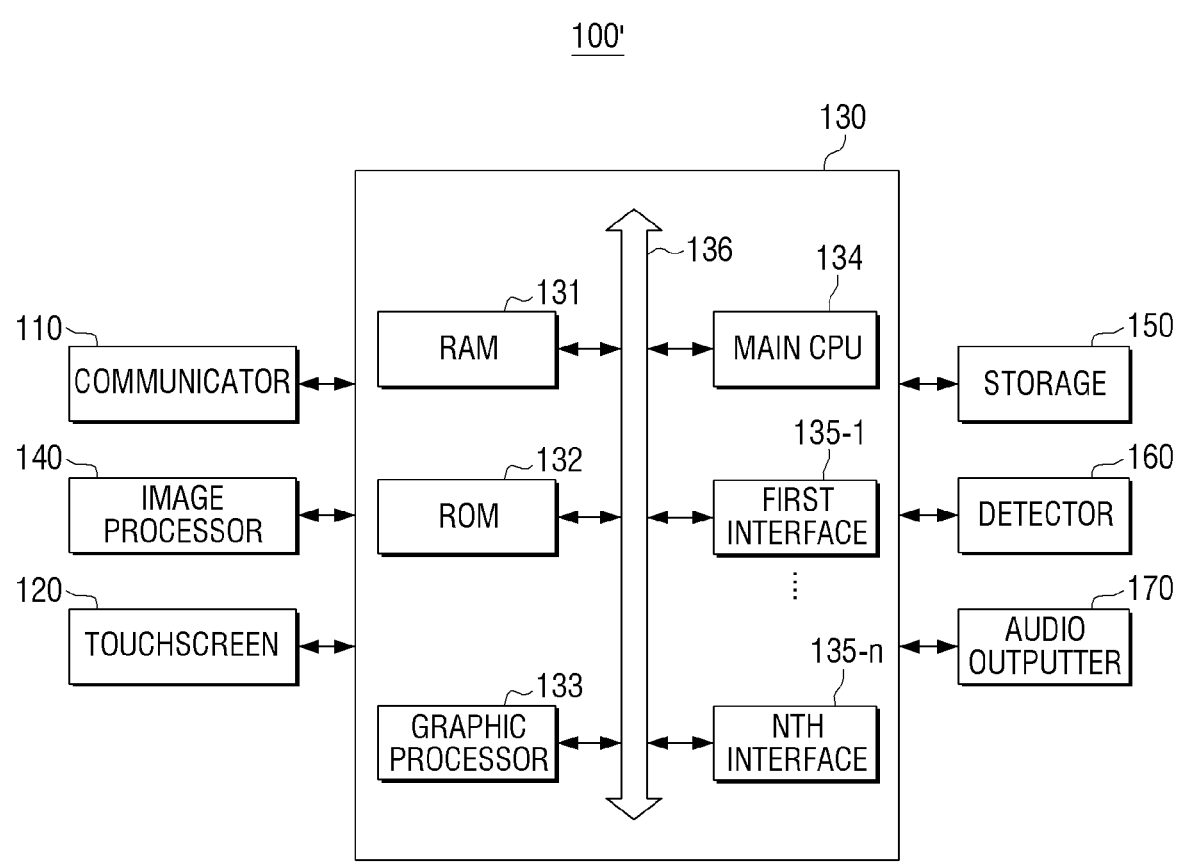
FIG. 3 is a block diagram illustrating a configuration of a user terminal in detail according to an exemplary embodiment.

FIG. 3 is a block diagram illustrating a configuration of a user terminal 100' in detail according to an exemplary embodiment. As illustrated in FIG. 3, the user terminal 100' may include the communicator 110, an image processor 140, the touchscreen 120, a storage 150, a detector 160, an audio outputter 170, and the controller 130. A configuration of the user terminal 100' illustrated in FIG. 3 is merely an example and, thus, is not limited to the aforementioned block diagram.

Accordingly, needless to say, some of components of the user terminal 100' illustrated in FIG. 3 may be omitted or modified or components may be added to the user terminal 100' according to a type of the user terminal 100' or a purpose of the user terminal 100'.

The communicator 110 may be a component that communicates with various types of external devices according to various types of communication methods. The communicator 110 may include at least one of a WiFi chip, a Bluetooth chip, a wireless communication chip, and a near field communication (NFC) chip. The controller 130 may communicate with an external server or various external devices using the communicator 110.

In particular, a WiFi chip and a Bluetooth chip may communicate using a WiFi method and a Bluetooth method, respectively. When the WiFi chip or the Bluetooth chip is used, various connection information items such as SSID and a session key may be first transmitted and received, communication is achieved using the connection information items and, then, various information items may be transmitted and received. The wireless communication chip may refer to a chip that performs communication according various communication standards such as IEEE, Zigbee, 3rd Generation (3G), 3rd Generation Partnership Project (3GPP), and Long Term Evolution (LTE). The NFC chip may refer to a chip that operates in a near field communication (NFC) manner using a band of 13.56 MHz among various RF-ID frequency bands such as 135 kHz, 13.56 MHz, 433 MHz, 860 to 960 MHz, and 2.45 GHz.

In particular, the communicator 110 may receive a captured image from the external electronic device 200. In this case, the communicator 110 may receive at least one image frame of a captured image and may also receive camera pose data corresponding to the image frame. In addition, the communicator 110 may transmit data of an indicator generated by a user touch to the external electronic device 200. In particular, the communicator 110 may transmit the camera pose data corresponding to the image frame with a generated indicator as well as the data of the indicator.

The image processor 140 may be a component for performing image processing on image data acquired from the communicator 110 or another image input device. The image processor 140 may perform various image processing processes such as decoding, scaling, noise filtering, frame rate conversion, and resolution conversion on image data.

The touchscreen 120 may display at least one of image data received from the communicator 110 and various UIs processed by a graphic processor 133. In this case, the touchscreen 120 may have various sizes. For example, the touchscreen 120 may have a size of 3 inches, 4 inches, 4.65 inches, 5 inches, 6.5 inches, 8.4 inches, and so on. A touchscreen 120 may include a plurality of pixels. In this case, horizontal number X vertical number of a plurality of pixels may be represented by resolution. For example, the touchscreen 120 may have resolution of 320×320, resolution of 360×480, resolution of 720×1280, resolution of 1280× 800, resolution of 3940×2160, or the like.

In addition, the touchscreen 120 may be embodied as various types of display panels. For example, the display panel may be embodied via various display technologies such as liquid crystal display (LCD), organic light emitting diodes (OLED), active-matrix organic light-emitting diode (AM-OLED), liquid crystal on silicon (LcoS), or digital light processing (DLP).

The touchscreen 120 may be coupled to at least one of a front region, a lateral region, and a rear region of the user terminal 100' in the form of a flexible display. The flexible display may be bent, twisted, or rolled without being damaged via a thin and flexible substrate like paper. The flexible display may be manufactured using a plastic substrate as well as a generally used glass substrate. When a plastic substrate is used, the flexible display may be formed using a low-temperature manufacture processor without a typical manufacture processor in order to prevent the substrate from being damaged. In addition, a glass substrate that covers flexible liquid crystal may be substituted with a plastic film so as to provide flexibility for folding and unfolding the substrate. It may be advantageous in that the flexible display is shock resistant as well as thin and light and is bent or twisted and is manufactured in various forms.

In addition, the touchscreen 120 may be embodied via coupling between a display panel and a touch detector. The touchscreen 120 may have a function of detecting a touch input pressure as well as a touch input position and a touched area in addition to a display function and may have a function of detecting a proximity touch as well as a real-touch. In addition, the touchscreen 120 may detect a pen touch as well as a touch of a user finger.

The storage 150 may store various modules for driving the user terminal 100'. For example, the storage 150 may store software including a base module, a sensing module, a communication module, a presentation module, a web browser module, and a service module. In this case, the base module may process a signal transmitted from each hardware item included in the user terminal 100' and transmit the signal to a high layer module. The sensing module may collect information from various sensors, analyze and manage the collected information, and include a face recognition module, a voice recognition module, a motion recognition module, an NFC recognition module, and so on. The presentation module may configure a display screen and include a multimedia module for reproducing and outputting multimedia content and a UI rendering module for processing a UI and graphics. The communication module may communicate with an external element. The web browser module may perform web browsing to access a web server. The service module may include a plurality of applications for providing various services.

As described above, the storage 150 may include various program modules but, needless to say, the various program modules may be partially omitted or modified or other modules may be added to the storage 150 according to the type and characteristics of the user terminal 100'. For example, when the aforementioned user terminal 100' is embodied as a tablet PC, a base module may further include a position determination module for determining a GPS-based position and may further include a sensing module for detecting a user operation.

The detector 160 may detect a surrounding environment and user input of the user terminal 100'. In particular, the detector 160 may include an illumination detector for detecting surrounding illumination, a touch detector for detecting a user touch input, a button detector for detecting a button input, a proximity detector for detecting user proximity, and so on.

However, this is merely an exemplary embodiment and, thus, the detector 160 may include various sensors such as a GPS sensor for detecting positional information, a motion detection sensor (e.g., a gyro sensor and an acceleration sensor) for detecting motion of the user terminal 100', a pressure sensor, and a noise sensor.

The audio outputter 170 may output various notification sounds or voice messages as well as various audio data items on which various processing operations such as decoding, amplification, and noise filtering are performed by an audio processor (not shown). In this case, the audio outputter 170 may be embodied as a speaker but this is a merely an exemplary embodiment and, thus, the audio outputter 170 may be embodied as an output terminal for outputting audio data. In addition, the audio outputter 170 may output voice data received from the external electronic device 200.

The controller 130 (or a processor) may control an overall operation of the user terminal 100' using various programs stored in the storage 150.

The controller 130 may include a RAM 131, a ROM 132, the graphic processor 133, a main CPU 134, first to $n^{th}$ interfaces 135-1 to 135-$n$, and a bus 136. In this case, the RAM 131, the ROM 132, the graphic processor 133, the main CPU 134, the first to $n^{th}$ interfaces 135-1 to 135-$n$, and so on may be connected to each other through the bus 136.

The RAM 131 may store an operation system (O/S) and an application program. In detail, when the user terminal 100' is booted, the O/S may be stored in the RAM 131 and various application data items selected by a user may be stored in the RAM 131.

A command set for system booting and so on may be stored in the ROM 132. When a turn-on command is input to supply power, the main CPU 134 may copy the O/S stored in the storage 150 according to the command stored in the ROM 132 to the RAM 131 and execute the O/S to boot a system. When booting is completed, the main CPU 134 may copy various application programs stored in the storage 150 to the RAM 131 and execute the application program copied to the RAM 131 to perform various operations.

The graphic processor 133 may generate an image including various objects such as an item, an image, and a text using a calculator (not shown) and a renderer (not shown). Here, the calculator may calculate an attribute value such as a coordinate value, a shape, a size, and color for displaying each object according to a layout of an image using a control command received from the detector 160. In addition, the renderer may generate an image with various layouts including an object based on the attribute value calculated by the calculator. The image generated by the renderer may be displayed in a display region of the touchscreen 120.

A main CPU 134 may access the storage 150 and perform booting using an operating system (O/S) stored in the storage 150. In addition, the main CPU 134 may perform various operations using various programs, contents, data, etc. stored in the storage 150.

First to $n^{th}$ interfaces 135-1 to 135-$n$ may be connected to the aforementioned various components. One of the first to $n^{th}$ interfaces 135-1 to 135-$n$ may be a network interface connected to an external device through a network.

In particular, when the user terminal device 100 communicates with the external electronic device 200 such as an external HMD, the controller 130 may receive an image captured by the external electronic device 200 from the external electronic device 200. In this case, the controller 130 may control the communicator 110 to receive a plurality of image frames of the image captured by the external electronic device 200 but this is merely an exemplary embodiment and, thus, the controller 130 may control the communicator 110 to receive one image frame.

In particular, upon receiving a plurality of image frames of the image captured by the external electronic device 200, the controller 130 may receive camera pose data corresponding to the plurality of image frames. In this case, the camera pose data may be data on a camera location (or a viewpoint) when a camera photographs a corresponding image frame at a predetermined angle and a 2D image may be generated as a 3D image through the camera pose data.

Figure 4A:
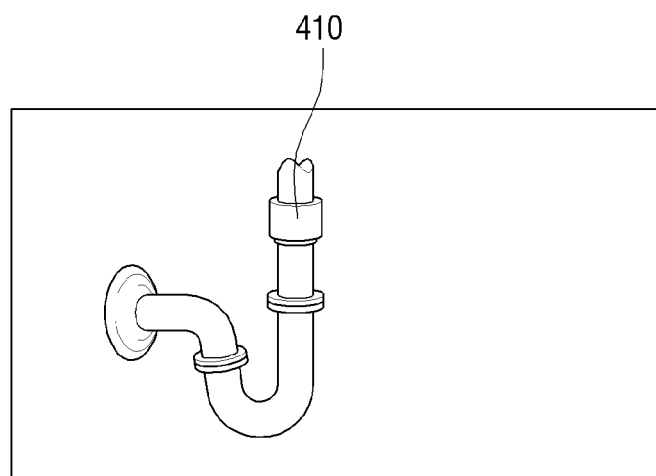
FIGS. 4A to 7 are flowcharts for explanation of a method of generating an indicator based on a user touch according to various exemplary embodiments of the present disclosure.

The controller 130 may control the touchscreen 120 to display an image received from the external electronic device 200 through the communicator 110. For example, when the external electronic device 200 photographs a pipe of a washstand, the controller 130 may control the touchscreen 120 to display an image containing a washstand pipe 410 received from the external electronic device 200, as illustrated in FIG. 4A.

In particular, upon receiving a plurality of image frames, the controller 130 may control the image processor 140 to process a received image frame and control the touchscreen 120 to display a processed image in real time like video. In addition, upon receiving one image frame, the controller 130 may control the image processor 140 and the touchscreen 120 to process and display the received image frame.

Figure 4B:
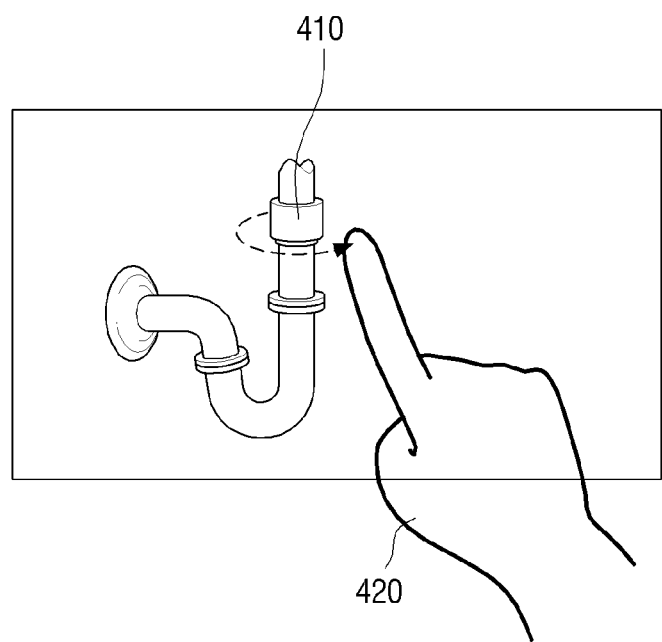
Figure 4C:
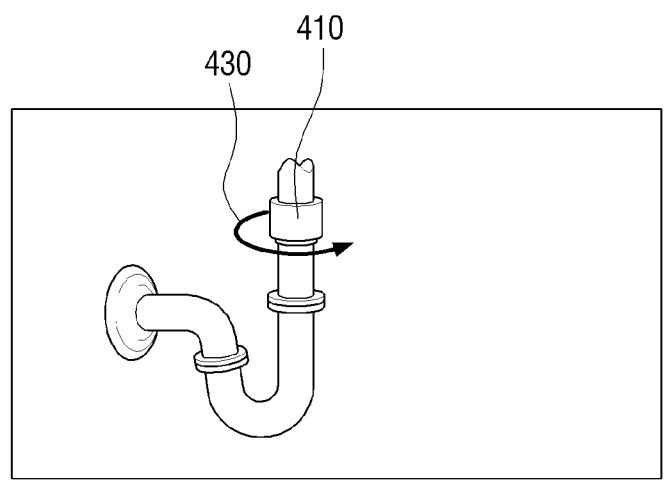

According to an exemplary embodiment, upon detecting a user touch from a region for displaying an object contained in an image during display of the image, the controller 130 may control the touchscreen 120 to display an indicator at a coordinate at which a user touch is detected. In detail, as illustrated in FIG. 4B, upon detecting a user touch 420 of touching one point in a displayed region in which the washstand pipe 410 is displayed and then moving the point to a right direction, the controller 130 may control the touchscreen 120 to generate an indicator 430 shaped like an arrow on the washstand pipe 410 according to a coordinate value at which the user touch 420 is detected, as illustrated in FIG. 4C. That is, the controller 130 may control the touchscreen 120 to generate and display an indicator according to a coordinate value of a point in which a user touch is detected. Here, the indicator 430 is associated with the washstand pipe 410 included in the image and may indicate directional information related to/associated with the washstand pipe 410.

Figure 5A:
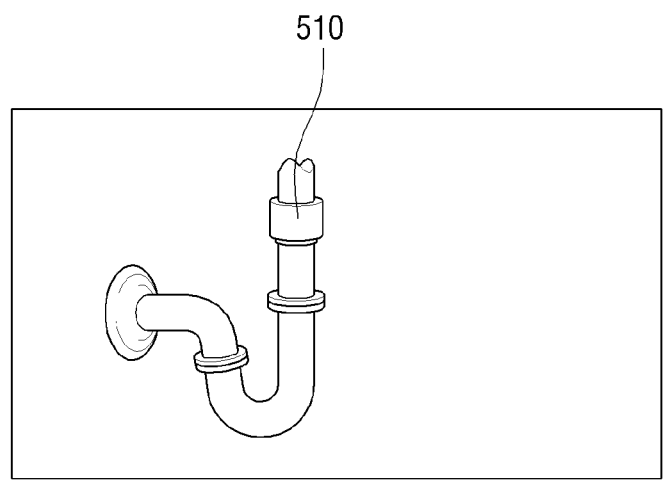
Figure 5B:
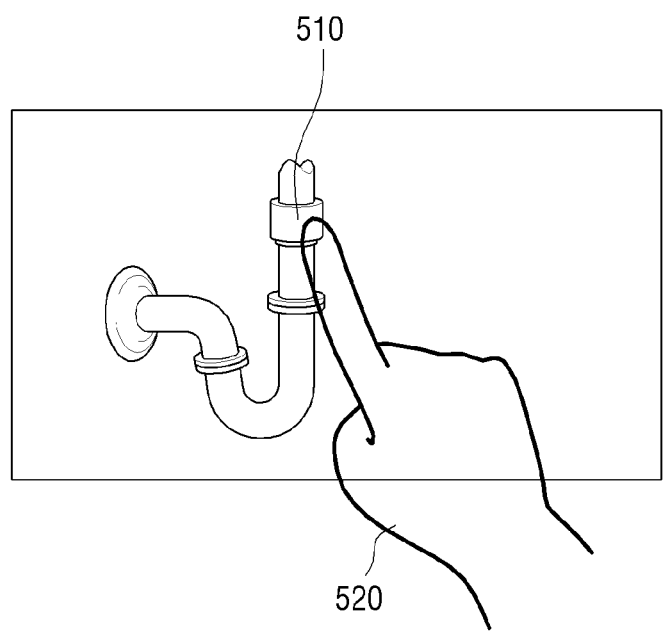
Figure 5C:
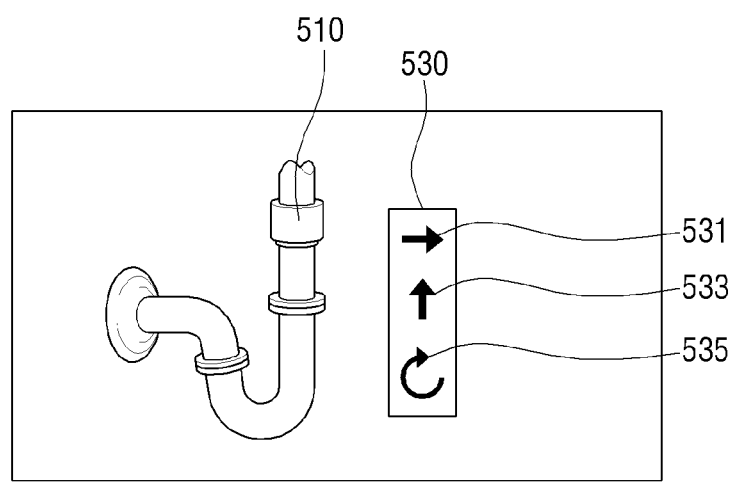
Figure 5D:
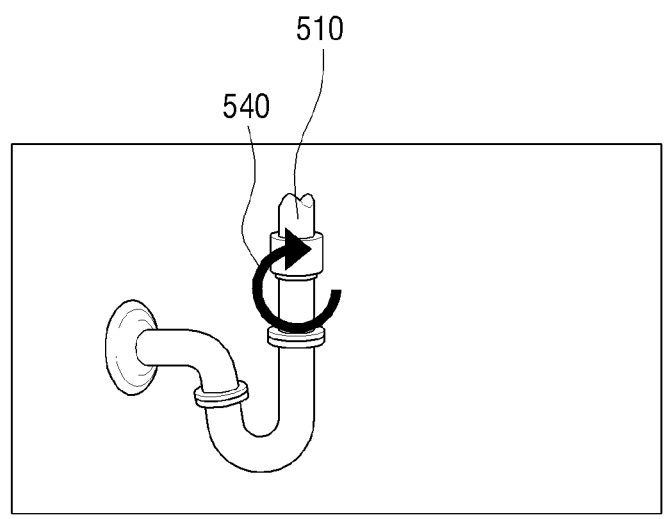

According to another exemplary embodiment, the controller 130 may select an indicator through a list including a plurality of indicator models. In detail, as illustrated in FIG. 5A, during display of a an image containing a washstand pipe 510, upon detecting a user touch 520 of touching one point of the washstand pipe 510, the controller 130 may control the touchscreen 120 to display a list 530 including a plurality of indicator models 531, 533, and 535 at a point in which a user touch is detected, as illustrated in FIG. 5B. Upon detecting a user touch of selecting a third indicator model 535 among the indicator models 531, 533, and 535 included in the list, the controller 130 may control the touchscreen 120 to display an indicator model 540 on which a user touch is detected at a point in which the user touch is detected, as illustrated in FIG. 5D.

In addition, the controller 130 may change a location, a size, a direction, and so on of an indicator according to user touch manipulation. For example, upon detecting a drag interaction of touching and then dragging an indicator by a user, the controller 130 may control the touchscreen 120 to move the indicator according to a drag interaction. Upon detecting a pinch-in or pinch-out interaction of touching two points of a displayed region for displaying an indicator and then moving the two points to be far from each other or to be close to each other by the user, the controller 130 may control the touchscreen 120 to adjust the size of the indicator according to the pinch-in or pinch-out interaction. In addition, upon detecting a drag interaction of touching and dragging a front part (e.g., an arrowhead of an arrow) of an indicator by the user, the controller 130 may control the touchscreen 120 to change a direction of the indicator according to the drag interaction.

Figure 6:
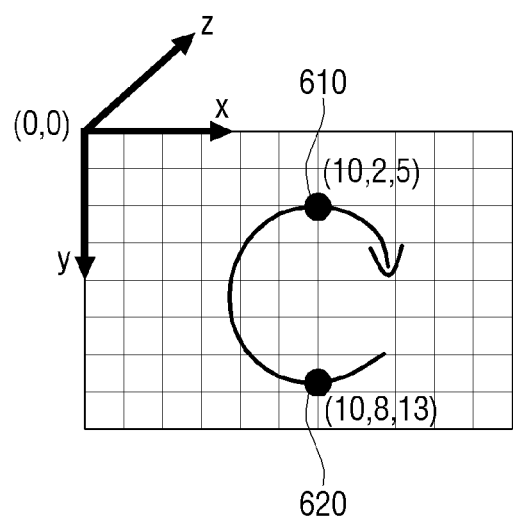

The controller 130 may adjust a z-axis location of the indicator according to at least one of a touch pressure, a touch size, and so on of a user touch. In detail, the controller 130 may set attribute of the indicator so as to increase a coordinate value of the z axis of a point in which a user touch is detected as a touch pressure of the user touch is increased or a touch size of the user touch is increased. For example, during drag to a second point 620 from a first point 610, when a touch pressure value of the first point 610 is a first value and a touch pressure value of the second point 620 is a second value greater than the first value, the controller 130 may set a coordinate value of the z axis of the first point 610 to 5 and set a coordinate value of the z axis of the second point 620 to 13, as illustrated in FIG. 6.

Figure 7:
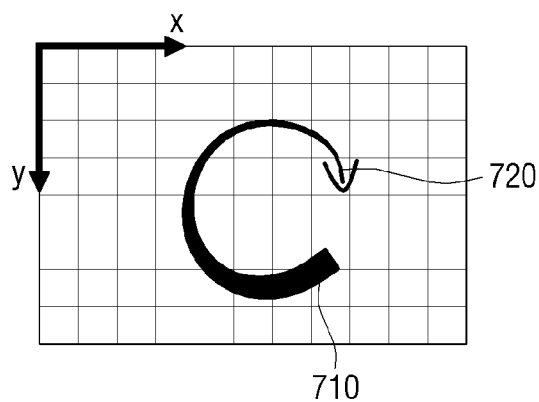

The controller 130 may control the thickness of the indicator according to at least one of a touch pressure and a touch size of a user touch. In detail, the controller 130 may set attribute of an indicator so as to increase the thickness of the indicator at a point in which a user touch is detected as the touch pressure of the user touch is increased or the touch size of the user touch is increased. For example, when a touch area is gradually reduced during drag to a second point 720 from a first point 710, the controller 130 may set the attribute of the indicator so as to gradually reduce the thickness of the indicator toward the second point 720 from the first point 710, as illustrated in FIG. 7.

The controller 130 may control the communicator 110 to transmit data on the indicator to the external electronic device 200. Here, the data on the indicator may include at least one of a coordinate value of a location for displaying the indicator, a shape of the indicator, a size of the indicator, and a thickness of the indicator. The controller 130 may control the communicator 110 to transmit camera pose data together with the data on a generated indicator. In this case, the controller 130 may control the communicator 110 to transmit camera pose data corresponding to an image frame into which the indicator is inserted together with the data on the indicator. For example, when an image frame into which an indicator is inserted is a first image frame, the controller 130 may control the communicator 110 to transmit camera pose data at a time point for photographing the first image frame of the received camera pose data together with the data on the indicator. In this case, when the camera pose data is not received from the external electronic device 200, the controller 130 may transmit data (e.g., information on time in which an image frame is displayed) on a selected image frame and allow the external electronic device 200 to search for camera pose data corresponding to the selected image frame. As described above, the camera pose data and the data on the indicator are transmitted together and, thus, the external electronic device 200 may display an indicator in a currently captured image in the form of 3D.

Hereinafter, the external electronic device 200 such as a HMD that is worn by a user and provides a 3D image will be described in detail with reference to FIGS. 8 to 13B.

Figure 8:
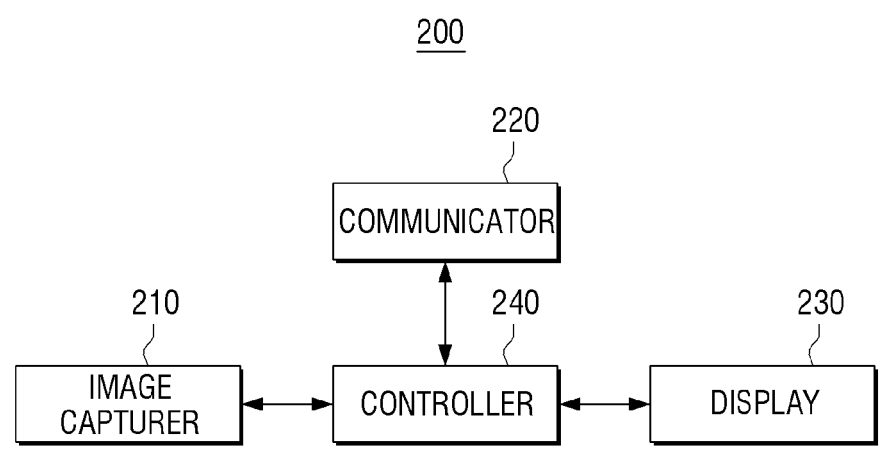
FIG. 8 is a schematic block diagram illustrating components of an electronic device according to an exemplary embodiment.

FIG. 8 is a schematic block diagram illustrating components of the external electronic device 200 according to an exemplary embodiment. As illustrated in FIG. 8, the external electronic device 200 may include an image capturer 210, a communicator 220, the display 230, and a controller 240.

The image capturer 210 may capture an image at the front of a user that is wearing the external electronic device 200. In the exemplary embodiment, the image capturer 210 may acquire camera pose data during image capturing as well as the captured image. In this case, the camera pose data may be matched with an image frame and be stored.

Figure 9A:
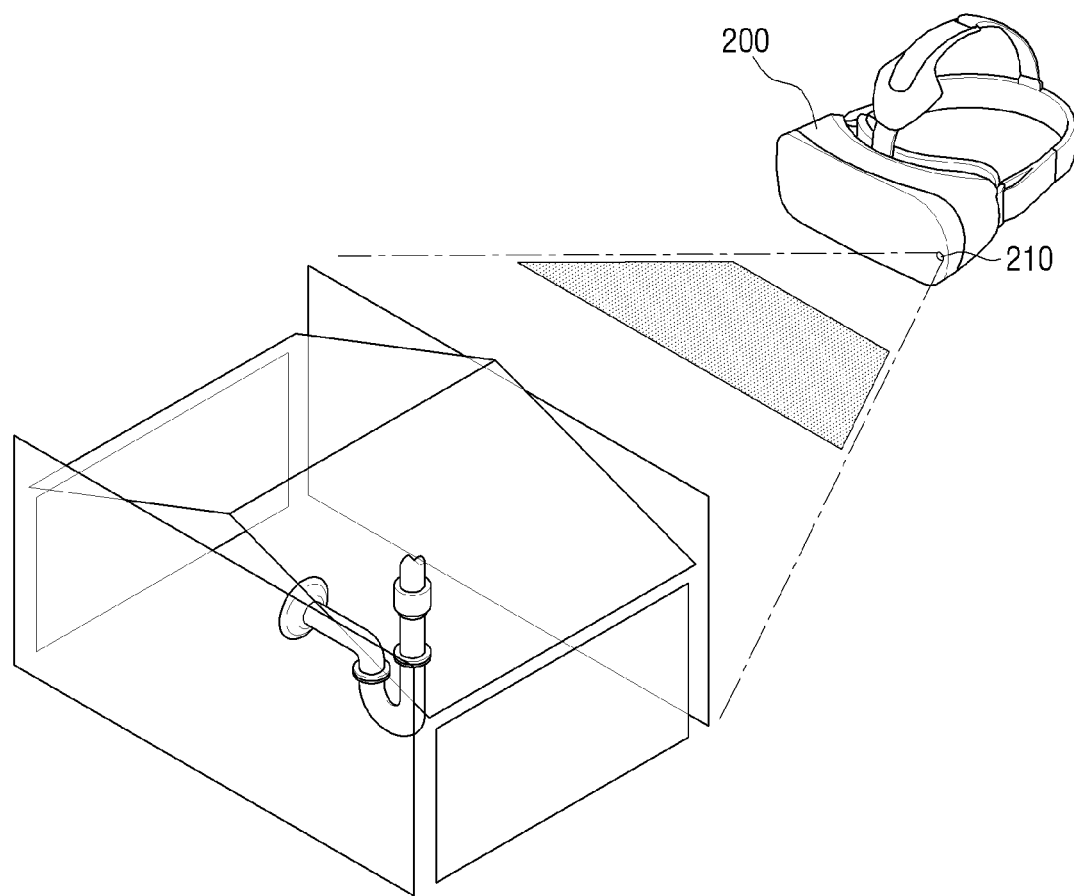
FIGS. 9A and 9B are diagrams illustrating an image in the form of 3D based on a user position according to an exemplary embodiment.
Figure 9B:
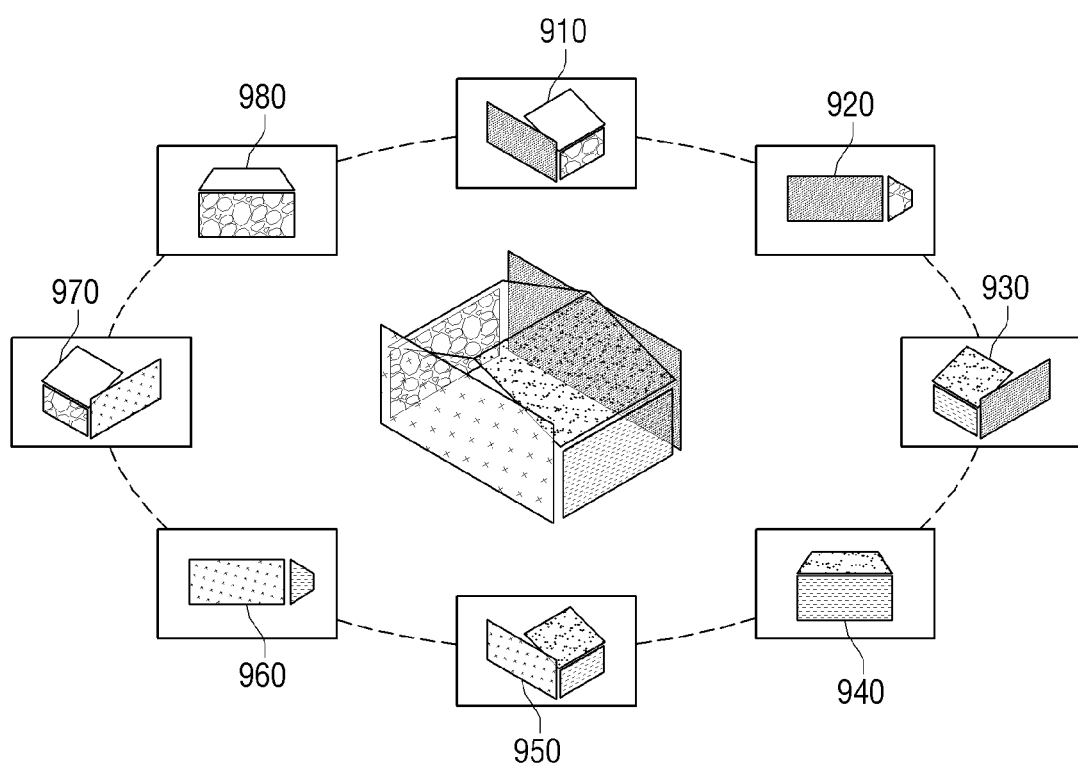

For example, as illustrated in FIG. 9A, when the image capturer 210 captures an image containing an object such as a washstand pipe 410 (FIG. 4A), the image capturer 210 may acquire a plurality of image frames 910 to 980 based on a location of the external electronic device 200 according to a user motion, as illustrated in FIG. 9B. In the exemplary embodiment, the image capturer 210 may acquire camera pose data corresponding to each of the image frames 910 to 980 as well as the plurality of image frames 910 to 980.

The communicator 220 may communicate with various types of external devices using various types of communication methods. In particular, the communicator 220 may communicate with the user terminal device 100. In detail, the communicator 220 may transmit an image frame of the image captured by the image capturer 210 to the user terminal device 100. The communicator 220 may transmit camera pose data together with the image frame to the user terminal device 100. The communicator 220 may receive at least one of data on the indicator and camera pose data corresponding to an image frame in to which the indicator is inserted, from the user terminal device 100.

The display 230 may display an image. In particular, the display 230 may display the image, for example, of the front photographed by the image capturer 210 in the 3D form. The display 230 may display an indicator in a currently captured image in the 3D form based on the data related to the indicator and the camera pose data, which are received from the user terminal device 100. In this case, the display 230 may be positioned on an internal surface of the external electronic device 200, to which user eyes are directed, when the user wears the external electronic device 200. Accordingly, the display 230 may provide a stereoscopic image with a sense of immersion to the user who wears the external electronic device 200.

The external electronic device 200 may include a projector (not shown) for projecting forward an image as well as the display 230. For example, upon receiving an image (e.g., an image during video telephony) from the user terminal device 100, the external electronic device 200 may project the image received from the user terminal device 100 through the projector to the outside of the external electronic device 200.

The controller 240 may control an overall operation of the external electronic device 200. In particular, during display of a captured image in the 3D form, the controller 240 may control the communicator 220 to transmit a capture image to the external user terminal device 100. The controller 240 may control the communicator 220 to receive data on an indicator indicating an object contained in the captured image from the external user terminal device 100. The controller 240 may control the display 230 to display an indicator in the 3D form on the captured image being displayed on the display 230 using the data on the indicator and the camera pose data.

In detail, the controller 240 may control the display 230 to display the image captured by the image capturer 210. In this case, the controller 240 may control the display 230 to display the image captured by the image capturer 210 in 3D.

The controller 240 may control the communicator 220 to transmit the captured image to the external user terminal device 100. In detail, the controller 240 may control the communicator 220 to receive camera pose data corresponding to a plurality of image frames together with the plurality of image frames of the captured image. The controller 240 may control the communicator 220 to transmit a first image frame of a time point in which an image of the captured image is required.

The controller 240 may control the communicator 220 to receive information on the indictor, from the user terminal device 100, to be inserted into an image being displayed on the display 230. In this case, the data of the indicator may include information on at least one of a coordinate value for displaying the indicator, a shape of the indicator, the size of the indicator, and the thickness of the indicator. In particular, the coordinate value for displaying the indicator may be a 2D touch coordinate value and include a coordinate value of the X axis and a coordinate value of the Y axis. The controller 240 may control the communicator 220 to transmit the camera pose data corresponding to the image frame into which the indicator is inserted as well as the information on the indicator. For example, when the image frame into which the indicator is inserted is a first image frame, the controller 240 may control the communicator 220 to receive together camera pose data including information on a location of the image capturer 210 when the first image frame is acquired.

The controller 240 may insert the indicator into a 3D type of image using the data on the indicator and the camera pose data.

Figure 10A:
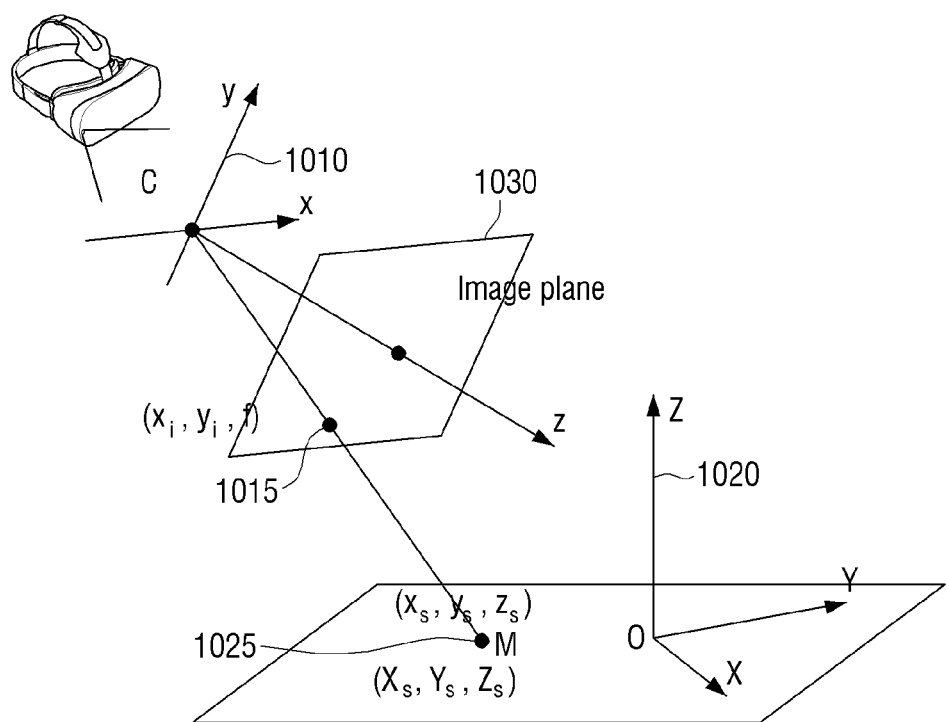
FIGS. 10A to 13 are diagrams for explanation of various embodiments in which an indicator is displayed in the form of 3D on an image displayed in the form of 3D according to various exemplary embodiments.

Referring to FIG. 10A, there may be an actual coordinates system 1020 based on the real world (i.e., based on reality) and based on a camera coordinates system 1010 for viewing based on a camera. In addition, a relationship between the two coordinates system 1010 and 1020 may be defined according to the camera pose data. That is, the camera pose data may include information on a location of a camera viewed based on the real world.

In particular, when a location value of the indicator is input in the form of 2D (i.e., a (X, Y) value), a first point 1015 of a camera plane 1030 may be a point for indicating a location for displaying an indicator on a 2D plane in FIG. 10A. In addition, when the first point 1015 is matched with the actual coordinates system 1020 using the camera pose data, the controller 240 may control the display 230 to display the indicator in a second point 1025 of FIG. 10A.

Figure 10B:
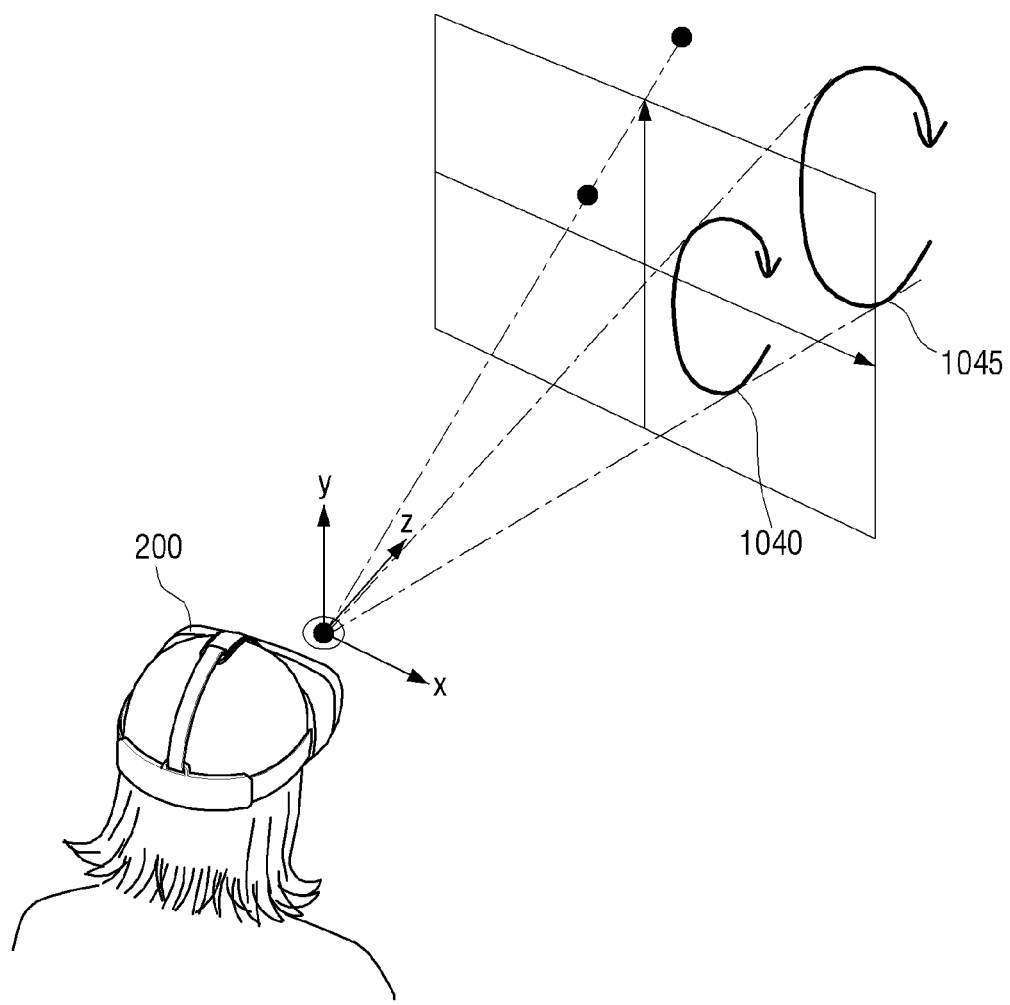

Accordingly, as illustrated in FIG. 10B, upon receiving a 2D coordinate value of an indicator 1020, the controller 240 may control the display 230 to generate and display an indicator 1045 in the form of 3D using camera pose data and a 2D coordinate value of an indicator 1040.

The controller 240 may receive camera pose data from the external user terminal device 100 but this is merely an exemplary embodiment and, thus, a 3D form of indicator may be generated using camera pose data corresponding to an image frame to which an indicator is inserted from pre-stored camera pose data.

Figure 11:
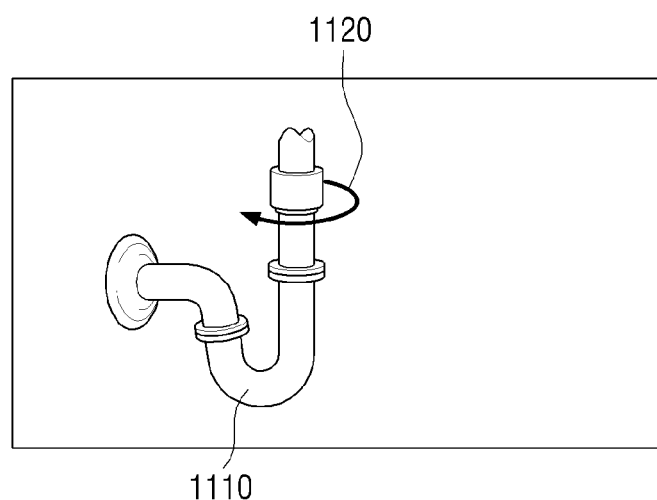

When a 3D form of indicator is generated, the controller 240 may control the display 230 to insert a 3D form of indicator into a captured image displayed in the form of 3D and to display the image. For example, as illustrated in FIG. 11, the controller 240 may control the display 230 to display an indicator 1120 in the form of 3D around an object 1110 displayed in the form of 3D.

Figure 12:
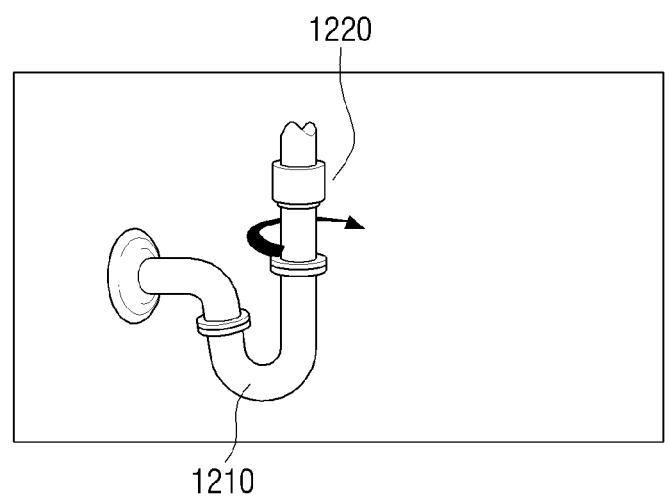

The controller 240 may control the display 230 to insert an indicator into a captured image and to display the image using various data items of the indicator. In detail, the controller 240 may control the display 230 to generate and display an indicator using various data items such as a size, direction, thickness, and so on of the indicator. For example, as illustrated in FIG. 7, upon receiving thickness information of an indicator, the controller 240 may control the display 230 to generate and display an indicator 1220 with a gradually reduced thickness around an object 1210, as illustrated in FIG. 12.

Figure 13:
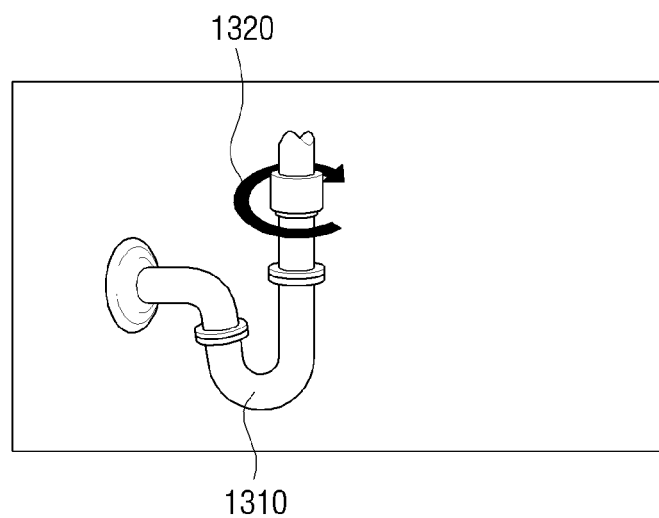

Upon receiving data on an indicator model, the controller 240 may control the display 230 to display an indicator model on a captured image in the form of 3D using the data on the indicator model and the camera pose data. In this case, the data on the indicator model may include data on a shape of the indicator model. For example, in FIG. 5D, upon receiving the data on the generated indicator model, the controller 240 may control the display 230 to generate and display an indicator model 1320 around an object 1310, as illustrated in FIG. 13.

Figure 14:
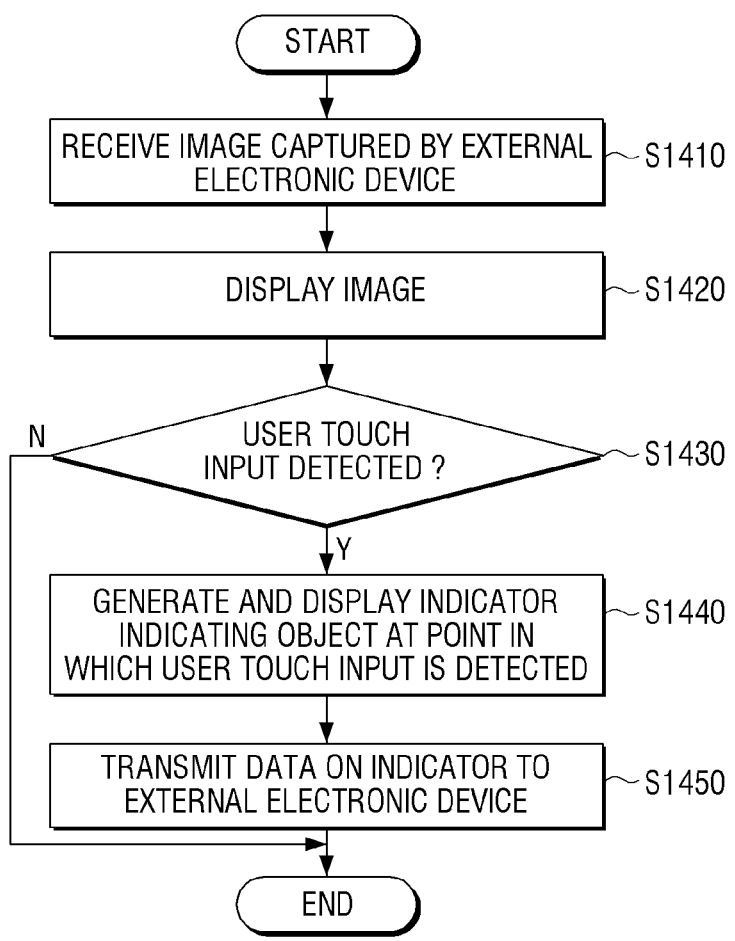
FIG. 14 is a flowchart for explanation of a method of controlling a user terminal device according to an exemplary embodiment.

FIG. 14 is a flowchart for explanation of a method of controlling the user terminal device 100 according to an exemplary embodiment.

First, the user terminal device 100 may receive an image captured by the external electronic device 200 (S1410). In this case, the user terminal device 100 may receive a plurality of image frames of the captured image and receive one image frame of the captured image.

The user terminal device 100 may display the image (S1420). In detail, the user terminal device 100 may process the received image frame and display an image in the form of 2D.

The user terminal device 100 may detect user touch input (S1430).

Upon detecting user touch input (S1430-Y), the user terminal device 100 may generate and display an indicator indicating an object at a point in which user touch input is detected (S1440).

In addition, the user terminal device 100 may transmit data on the indicator to the external electronic device 200 (S1450). In this case, the user terminal device 100 may transmit camera pose data corresponding to an image frame into which an indicator is inserted together with the data on the indicator to the external electronic device 200.

Figure 15:
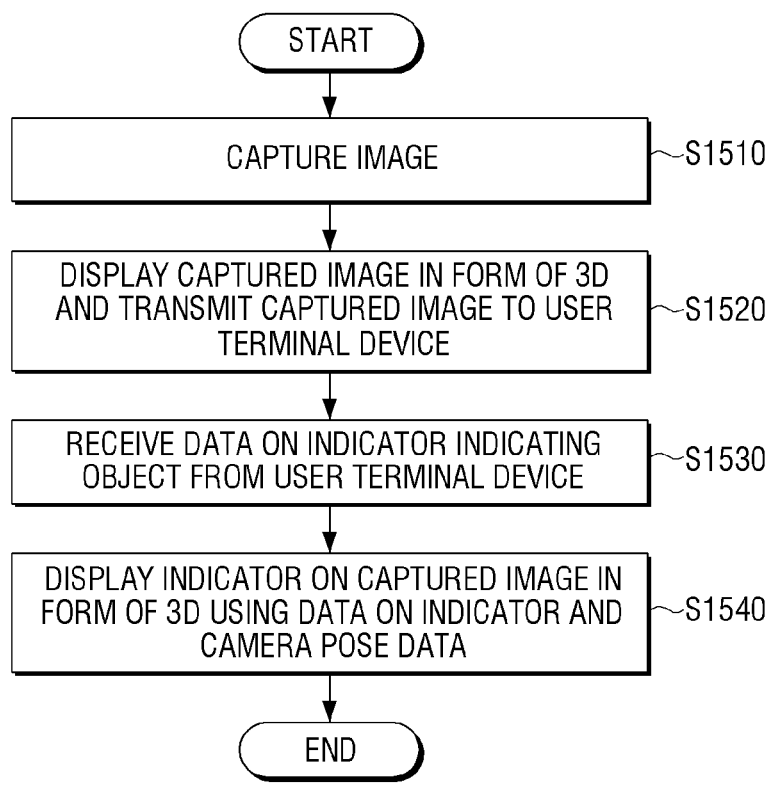
FIG. 15 is a flowchart for explanation of a method of controlling an electronic device according to an exemplary embodiment.

FIG. 15 is a flowchart for explanation of a method of controlling the external electronic device 200 according to an exemplary embodiment of the present disclosure. In this case, the external electronic device 200 may be a HMD that is worn by a user and provides a 3D form of stereoscopic image.

First, the external electronic device 200 may capture an image (S1510). In this case, the external electronic device 200 may capture an image of the front of the user including a specific object.

The external electronic device 200 may display the captured image in the form of 3D and transmit the captured image to the user terminal device 100 (S1520). In this case, the external electronic device 200 may transmit camera pose data corresponding to a captured image frame together with the captured image frame to the user terminal device 100.

The external electronic device 200 may receive the data on the indictor indicating an object from a user terminal device (S1530). In this case, the external electronic device 200 may receive camera pose data (i.e., camera pose data acquired during photograph of an image frame into which an indicator is inserted) corresponding to an image frame into which the indicator is inserted as well as the data on the indicator, from the user terminal device 100.

In addition, the external electronic device 200 may display the indicator on the captured image in the form of 3D using the data on the indicator and the camera pose data (S1540).

FIG. 16 is a sequence diagram for explanation of a method of providing an image of an image providing system according to an exemplary embodiment of the present disclosure.

First, the external electronic device 200 may capture an image (S1610).

The external electronic device 200 may display the image in the form of 3D (S1620).

The external electronic device 200 may transmit the captured image to the user terminal device 100 (S1630). In this case, the external electronic device 200 may transmit the camera pose data together with the image.

The user terminal device 100 may display the received image in the form of 2D (S1640).

The user terminal device 100 may display an indicator on the image according to detected user touch input on the displayed image (S1650).

The user terminal device 100 may transmit data on the generated indicator (S1660). In this case, the data on the indicator may include at least one of a coordinate value of a location for displaying the indicator, a shape of the indicator, a size of the indicator, and a thickness of the indicator and may be transmitted together with the camera pose data.

The external electronic device 200 may display the indicator on the image in the form of 3D using the received data on the indicator and the camera pose data (S1670).

According to the aforementioned diverse exemplary embodiments of the present disclosure, various interactions may be enabled between a user terminal device and an electronic device for providing virtual reality, such as a HMD, thereby providing more intuitive and various user environments to a user.

Although the case in which a shape of an indicator is an arrow has been described according to the aforementioned exemplary embodiment of the present disclosure, this is merely an exemplary embodiment and, thus, the indicator may be formed like various types of arrows with a heart shape, a star shape, or the like.

Although the case in which an indicator is generated according to a user touch has been described according to the aforementioned exemplary embodiment of the present disclosure, this is merely an exemplary embodiment and, thus, the indicator may be generated according to user manipulation such as mouse manipulation and pointing manipulation.

Although the case in which an indicator inserted into a captured image is generated and displayed has been described according to the aforementioned exemplary embodiment of the present disclosure, this is merely an exemplary embodiment and, thus, various AR objects such as a text and an image may be generated and displayed and may be transmitted to the external electronic device 200. For example, upon detecting a user command for inserting a text into an image received from the external electronic device 200, the user terminal device 100 may transmit information on the inserted text to the external electronic device 200. The external electronic device 200 may display the text inserted into the image in the form of 3D based on the information on the inserted text and the camera pose data.

The method of controlling the user terminal and the electronic device according to the aforementioned diverse exemplary embodiments of the present disclosure may be embodied as a program and provided to a display device or an input device. In particular, a program containing the method of controlling a display device may be stored and provided in a non-transitory computer readable medium.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present inventive concept. The present teaching can be readily applied to other types of apparatuses. Also, the description of the exemplary embodiments of the inventive concept is intended to be illustrative, and not to limit the scope of the claims, and many alternatives, modifications, and variations will be apparent to those skilled in the art.

What is claimed is:

1. A system including a user terminal device and an external device, the user terminal device comprising:
   a communication circuitry;
   a touchscreen; and
   at least one processor configured to:
      control the touchscreen to display an image captured by a camera of the external device, received from the external device through the communication circuitry,
      based on a touch input being received on the image displayed on the touchscreen, control the touchscreen to display a first indicator corresponding to an object included in the image, the first indicator being displayed in a two-dimensional (2D) form at touch points where the touch input is input, and
      control the communication circuitry to transmit, to the external device, data regarding to the first indicator,
   wherein the external device is configured to determine a position of a second indicator, corresponding to the first indicator, to be inserted to an image displayed in three-dimensional (3D) form on a display of the external device based on the data received from the user terminal device and camera pose data on a viewpoint in which the image was captured by the camera of the external device, and insert the second indicator in 3D form to the image displayed on the display of the external device based on the determined position,
   wherein the touch points comprise a first touch point and a second touch point,
   wherein the data regarding to the first indicator comprises information regarding to a first coordinate value of a z axis of the second indicator determined based on a first touch pressure value of the touch input at the first touch point and information regarding to a second coordinate value of a z axis of the second indicator determined based on a second touch pressure value of the touch input at the second touch point, and
   wherein, when the first touch pressure value is greater than the second touch pressure value, the first coordinate value of the z axis is greater than the second coordinate value of the z axis.

2. The system as claimed in claim 1, wherein the at least one processor is further configured to adjust a thickness of the first indicator according to at least one of a plurality of pressure values and a touch size of the touch input.

3. The system as claimed in claim 1, wherein the at least one processor is further configured to control the touchscreen to display a selected pre-stored indicator model at a touch point where the touch input is input in response to one of pre-stored indicator models being selected based on a previous touch input.

4. The system as claimed in claim 1, wherein the data on the first indicator further comprises at least one of information on a size of the first indicator, and information on a thickness of the first indicator.

5. A method of controlling a system including a user terminal device and an external device, the method comprising:
   receiving, from the external device, an image captured by a camera of the external device;
   displaying the image on a touchscreen of the user terminal device;
   based on a touch input being received on the image displayed on the touchscreen, displaying, on the touchscreen of the user terminal device, a first indicator corresponding to an object included in the image, the first indicator being displayed in a two-dimensional (2D) form at touch points where the touch input is input;
   transmitting, to the external device, data regarding to the first indicator;
   determining a position of a second indicator, corresponding to the first indicator, to be inserted to an image displayed in three-dimensional (3D) form on a display of the external device based on the data received from the user terminal device and camera pose data on a viewpoint in which the image was captured by the camera of the external device; and
   inserting the second indicator in 3D form to the image displayed on the display of the external device based on the determined position, and
   wherein the touch points comprise a first touch point and a second touch point,
   wherein the data regarding to the first indicator comprises information regarding to a first coordinate value of a z axis of the second indicator determined based on a first touch pressure value of the touch input at the first touch point and information regarding to a second coordinate value of a z axis of the second indicator determined based on a second touch pressure value of the touch input at the second touch point, and
   wherein, when the first touch pressure value is greater than the second touch pressure value, the first coordinate value of the z axis is greater than the second coordinate value of the z axis.

6. The method as claimed in claim 5, further comprising adjusting a thickness of the first indicator according to at least one of a plurality of pressure values and a touch size of the touch input.

7. The method as claimed in claim 5, wherein the displaying the first indicator comprises:
   selecting one pre-stored indicator model from a plurality of pre-stored indicator models based on a previous touch input; and
   displaying the selected one pre-stored indicator model at a touch point where the previous touch input is input.

8. The method as claimed in claim 5, wherein the data on the first indicator further comprises at least one of information on a size of the first indicator, and information on a thickness of the first indicator.

* * * * *